under Patent [19]

Webb et al.

[11] Patent Number: 4,860,403
[45] Date of Patent: Aug. 29, 1989

[54] METHOD OF ELIMINATING AGING STEP IN POULTRY PROCESSING

[75] Inventors: Jerry E. Webb, Farmington; Roger L. Dake, Fayetteville; Rodney E. Wolfe, Springdale, all of Ark.

[73] Assignee: Campbell Soup Company, Camden, N.J.

[21] Appl. No.: 220,472

[22] Filed: Jul. 18, 1988

[51] Int. Cl.$^4$ .................................... A22C 21/00
[52] U.S. Cl. ................................... 17/1 E; 17/47; 17/11; 17/11.2
[58] Field of Search ............... 17/1 E, 25, 11.2, 11, 17/47; 426/235, 237

[56] References Cited

U.S. PATENT DOCUMENTS

| | | |
|---|---|---|
| 2,129,968 | 9/1938 | Sargent . |
| 2,210,376 | 8/1940 | Onorato . |
| 2,306,773 | 12/1942 | Biffinger . |
| 2,544,681 | 3/1951 | Harsham . |
| 2,621,362 | 12/1952 | Cosden . |
| 2,879,539 | 3/1959 | Cervin . |
| 3,035,508 | 5/1962 | Nelson . |
| 3,104,170 | 9/1963 | Mahon . |
| 3,462,278 | 8/1969 | Mahon . |
| 3,474,490 | 10/1969 | Groover . |
| 3,555,594 | 1/1971 | Groover . |
| 3,828,397 | 8/1974 | Harben, Jr. ............... 17/1 E |
| 4,074,389 | 2/1978 | Blair . |
| 4,092,761 | 6/1978 | Mc Whirter ............... 17/1 E |
| 4,196,221 | 4/1980 | Dew ............................ 426/237 |
| 4,517,207 | 5/1985 | Kress . |
| 4,675,947 | 6/1987 | Clatfelter . |

OTHER PUBLICATIONS

Abstract of Froning and Uijttenboogart, "Effect of Postmortem Electrical Stimulation on Quality of Hot and Cold Deboned Chicken Broiler Breast Muscle", 66 Poultry Science Abstracts 101 (1987).
Abstract of Thompson et al., "Effect of Postmortem Electrical Stimulation of the Tenderness of Hot-Boned, Chill-Boned, and Aged-Boned Broiler Breast Fillets", Poultry Science Journal 133 (1986).
Pearson and Dutson, "Electrical Stimulation", 1 Advances in Meat Research 64–66 (1985).
Froning, "Electrical Stimulation May Allow Hot Boning," Broiler Industry 24–26 (Jun. 1988).
Reprint, "Tender Meat in 24 Minutes!", Broiler Industry (Feb. 1988).
Maki and Froning, "Effect of Post-Mortem Electrical Stimulation on Quality of Turkey Meat", 66 Poultry Science 1155–1157 (1987).
Thompson et al., "Tenderness and Physical Characteristics of Broiler Breast Fillets Harvested at Various Times from Post-Mortem Electrically Stimulated Carcasses", 66 Poultry Science 1158–1167 (1987).

Primary Examiner—Willis Little
Attorney, Agent, or Firm—Banner, Birch, McKie & Beckett

[57] ABSTRACT

A method for processing poultry, including the conversion of live birds to component meat parts in substantially less time and using substantially less energy, which method comprises the steps of: providing a live poultry bird; slaughtering said bird with the application of electrical energy to stun or electrocute said bird; applying a sequence of electrical stimulation during bleedout; scalding the carcass; applying additional electrical stimulation immediately after scalding and subjecting said carcass to a conditioning step wherein said carcass is held in a warm, humid atmosphere for a period of time sufficient to render the poultry meat tender upon subsequent cooking without the need for an extended carcass aging period; and defeathering and eviscerating said carcass.

15 Claims, No Drawings

METHOD OF ELIMINATING AGING STEP IN POULTRY PROCESSING

BACKGROUND OF THE INVENTION

1. Field of the Invention

This invention relates to the processing of poultry. Specifically, it relates to a method of preparing poultry exhibiting excellent tenderness characteristics wherein the conventional step of extended, low temperature aging of defeathered and eviscerated poultry carcasses can be eliminated. More specifically, the invention relates to a method of processing poultry wherein the carcasses are maintained at near-normal body temperature throughout the process and in which the carcasses, prior to defeathering and eviscerating, are subject to electrical stimulation and a relatively short conditioning step in warm humid atmosphere.

2. Description of the Prior Art

Traditional methods of processing poultry typically begin by killing the poultry and bleeding it, usually by cutting the bird's jugular vein. Either before or during the killing, the bird is subjected to an electrical shock. The purpose of this shock is to stun the poultry so that it does not struggle and jump about during subsequent processing steps. This struggling can cause broken wings and other bruises to the poultry, thereby reducing the value of poultry. The stunning also can make the removal of feathers easier.

After killing and bleeding, the carcass usually is scalded to make the removal of feathers easier. Next, the carcass is defeathered, then eviscerated. Deterioration of the eviscerated carcass during the extended traditional processing scheme must be avoided, so its temperature at this point is reduced to about 40° F., typically by chilling the carcass in an ice or cold water bath. The chilled carcass then is aged at this low temperature for an extended period of time (e.g. on the order of about 4 to 12 hours) to provide the required degree of tenderness.

After low temperature aging, the carcasses are drained and can be prepared for distribution either raw or cooked, deboned or on the bone. Further, the carcass can also be cut into pieces before distribution or cooking. If the poultry is cooked, cooking time is extended by the time necessary to raise the temperature of the meat from about 40° F. to the cooking temperature. Finally, the parts or carcasses are packaged for distribution.

In an alternative processing scheme, the poultry is shocked after it is "stick", i.e., after the jugular vein is cut. The purpose of the shock is to numb the bird so that it is not damaged by struggling. Such a scheme is described in U.S. Pat. No. 3,474,490. Stunning after slaughter also results in increased bleeding.

Both of the described processing schemes have proven to be unsatisfactory because of the long time between slaughter and shipment and the high energy consumption and capital costs associated with the process. The time required to obtain deboned raw flesh is typically up to 5½ hours. An additional up to 3½ hours is required for cooking and subsequent processing, including the time required to heat the poultry from the chilling temperature (approximately 40° F.). The capital costs for these systems can be substantial when commercial quantities of poultry are to be processed. The cost of aging facilities, chill tanks, ancillary equipment, and consumables such as ice, refrigeration, and the energy used to cool, reheat, and cook, must be considered. Even methods of including agents intended to improve the organoleptic quality by tenderizing the meat the reducing weight loss due to moisture evaporation, as described in U.S. Pat. No. 3,104,170, have proven to be unsatisfactory in some respects.

The goal of shortening poultry processing time while producing an organoleptically pleasing product has been illusive. The method taught in U.S. Pat. No. 2,129,968 attempted to shorten processing time by simultaneously slitting the throat of the bird while shocking it thought the knife. The shock is said to cause convulsive muscle contraction, thereby expelling the blood from the body instantly. This contraction also is said to empty the bird's stomach and crop. During periods when the birds are conveyed to the knife and from the knife to the defeathering operation, the poultry is conditioned in warm, approximately 120° F., high humidity air, in preparation for feather removal. This treatment is utilized in place of the traditional scalding step prior to the defeathering. However, a reasonable estimate of the amount of time saved by this process step is less than about 20 minutes. This saving is relatively insignificant, however, because the remainder of the traditional process, including chilling and lengthy aging, must be faithfully practiced.

A method of poultry processing wherein a conventional aging step is not utilized is taught in U.S. Pat. No. 4,675,947. This method requires that the bird be slaughtered without application of electrical energy to stun the bird before subsequent processing steps. However, random movement of unstunned birds renders ineffective some automatic processing equipment, such as mechanical neck cutters.

It is an object of this invention to provide a method of poultry processing which greatly reduces energy consumption and time required as compared to conventional processes.

It is another object of this invention to provide a method of producing organoleptically acceptable poultry while eliminating the aging period.

It is a further object of this invention to provide a method for poultry processing which, by substantially shortening the time required for processing, obviates the need for refrigeration until after the poultry is cooked or is cooled and ready to be packaged for sale.

It is yet another object of this invention to provide a method of poultry processing wherein the conventional aging period is eliminated without affecting the organoleptic properties of the poultry and the ability to utilize automatic processing equipment.

SUMMARY OF THE INVENTION

In accordance with these and other objects, this invention relates to a method for processing poultry, including the conversion of live birds to component meat parts, if desired, in substantially less time and using substantially less energy, which method comprises the steps of: (a) providing a live poultry bird; (b) slaughtering said bird with the application of electrical energy to stun or electrocute said bird; (c) subjecting the carcass of step (b) to intermittent electrical stimulation while it is bleeding; (d) scalding the carcass resulting from step (c); (e) subjecting said carcass to a relatively short conditioning step wherein said carcass is held in a warm, humid atmosphere and during which intermittent electrical stimulation is applied to said carcass for a period of time sufficient to render the poultry meat tender upon subsequent cooking without the need for an extended, low temperature carcass aging period; (f) defeathering and eviscerating said carcass.

DETAILED DESCRIPTION OF THE INVENTION

As used throughoiut the specification and claims, the word "poultry" means any fowl, whether domestic or hunted as game, such as, but not limited to, chicken, turkey, duck, goose, guinea hen, and the like. Further, "cooked" means any degree, including "partially done" and "ready-to-serve".

The method taught in U.S. Pat. No. 4,675,947 requires that the poultry be killed without the application of electrical energy during the period the bird is killed, for example, when it's throat is slit. As described in that patent, muscular contractions of an unstunned bird can continue uninhibited throughout bleeding. Such uninhibited contractions were necessary in that method. However, as noted above, the bird's uncontrolled movement made it difficult to use automatic processing equipment. Thus, there existed a continuing need for a method of killing poultry with application of electrical energy to stun the carcass which does not require a conventional, low temperature aging step.

The present invention is based on the discovery that organoleptically acceptable poultry can be prepared after being stunned during slaughter even though the conventional low temperature aging step is eliminated. The poultry is killed with the application of electrical energy to stun it, is bled, and preferably is conditioned before feather removal. During the bleeding and conditioning steps, the carcass is electrically stimulated to induce rigor mortis. Compared to conventional techniques, the method of the invention not only shortens processing time but also reduces energy consumption. The method also affords more effective utilization of automatic processing equipment than the method of U.S. Pat. No. 4,675,947. Further, elimination of the chill tank may reduce the risk of bacterial cross-contaminatiion among carcasses. Not only is total processing time shortened, but also the resulting product is acceptably tender.

Poultry to be processed by the method of this invention first is at least partially immobilized. In the preferred embodiment, the poultry is hung in shackles, usually by the feet. This preparation step is well known in the art. The poultry then is electrically stunned and slaughtered. Typically, the bird is slaughtered by slitting its jugular vein; it can be stunned simultaneously. In the practice of the method of this invention, any method of killing the bird which introduces electricity into the carcass and which allows the blood to be quickly drained from the carcass is satisfactory. Typically, between about ½ to 3 minutes are required to complete bleeding.

Any method of stunning may be utilized. Various methods of stunning are known to those skilled in the art. For example, birds may be stunned as disclosed in U.S. Pat. Nos. 2,129,968; 2,210,376; 2,306,773; 2,621,362; 2,879,539; and 3,555,594. Other methods of stunning also may be utilized. Stunning is sufficient when the bird becomes quiet, with wings folded in the manner known to those skilled in the art as characteristic of properly-stunned poultry.

It has been discovered that poultry can be made tender without a conventional aging period by electrically stimulating a stunned carcass while it is bleeding and during a subsequent conditioning period. The purpose of this stimulation is to induce contraction and relaxation of the muscle tissue. Practice of the method of this invention quickly induces rigor mortis in the carcass, thereby eliminating the need to age the carcass to make it tender. Further, the ability to induce rigor mortis without having to lower the temperature of the carcass significantly reduces the cost of processing the poultry; neither refrigeration nor a chill bath is needed, and less energy is required to cook the unchilled meat produced by the method of this invention.

As the carcass is bleeding, it is transported, preferably on a shackle line, to a conventional scalding operation, and electrical stimulation is applied to the carcass to cause muscle contractions during the bleeding period. Typically, a carcass is bled for up to about 3 minutes. In accordance with the method of the invention, the carcass is stimulated during this period, preferably during the last half thereof. Preferably, the carcass is allowed to bleed for 90 seconds, and it is stimulated, as described herein, during the last 45 seconds of the bleeding period.

In the practice of this invention, poultry carcasses are electrically stimulated for between about 2 to 15 minutes during the bleeding and conditioning periods. The entire carcass is stimulated at conditions sufficient to overcome the electrical resistance of the carcass at the area at which current is introduced and cause the muscles to contract. Either the voltage or the amperage can be adjusted, depending upon the number of chickens to be stimulated simultaneously. In one embodiment of the invention, a no-load voltage of 40 volts was applied between the breasts and the feet of 20 chickens mounted in parallel. The current flow was approximately 0.8 amps at 40 volts.

The current is applied intermittently so that the muscles alternately contract and relax. The durations of the periods with and without current are variable and are preferably between about 0.1 to 5 seconds with current and between about 0.1 to 5 seconds without current. More preferably, periods of between about 0.2 to 2 seconds are used. Most preferably, 0.3-second periods of stimulation are alternated with 0.3-second periods without stimulation. The most preferred periods allow the muscles to contract fully and then relax completely to maximize the efficiency of the operation.

Apparatus used to apply current to the birds are well-known to those skilled in the art, and any of the commonly-used forms may be employed. In general, equipment used to apply the electrical stimulation should be capable of adjustment to vary both the period of current application and the period between current applications. Further, the equipment should ensure good contact with the poultry to ensure current flow.

The poultry can be treated individually or continuously, i.e., in series or in parallel. Current can be passed through essentially the entire carcass by ensuring that the current is passed, for example, from the breast to the feet. The feet can be held in shackles or attached to a bar or other implement. A preferred apparatus for applying electrical stimulation comprises a metal rod which contacts the breast area and the shackle which holds the feet. Adequate contact with the breast area rod is ensured by locating it so that the suspended carcass must touch it. Preferably, the shackle is grounded (neutral) and the rod which contacts the breast area is charged.

Other methods of ensuring adequate electrical contact also are acceptable. For example, the bird can be attached to a conductive bar with conductive wire. Contact may be made by a wire or wires which touch the poultry. Alternatively, contacts can be inserted into the poultry. Any of these methods can be utilized in the practice of this invention.

The voltage difference between the contacts causes current to flow when the poultry touches each contact and completes the circuit. A difference of between about 10 to 500 volts is useful. However, between about 10 to 200 volts preferably is maintained during the stimulation treatment. Both bars and rods can be one-piece or segmented construction and can be horizontally and vertically adjustable to ensure adequate contact. Precise construction details are not critical to the invention.

Scalding is an operatiion well known in the art wherein the carcass is prepared for the defeathering operation. Typically, the carcasses are scalded in water at a temperature between about 125°–140° F. for 60 to 120 seconds.

Immediately following the scalding operation, scalded carcasses are passed into an area which is maintained at a temperature between about 70°–110° F., preferably between about 85°–95° F., wherein the carcass is conditioned. The carcass again is electrically stimulated during the conditioning period to quickly induce rigor mortis. To prevent drying of the carcass, which could degrade the quality of the meat, a high humidity atmosphere typically is established in the area. The relative humidity preferably should be at least 70 percent, more preferably 85 percent, and most preferably 100 percent. Neither the relative humidity nor the method used to maintain this humidity level is critical to the practice of this invention.

The sequence of scalding, then conditioning, is not critical. The carcasses can be first conditioned, then scalded. However, the latter sequence makes subsequent defeathering more difficult.

Additional protection against dehydration of the carcasses is obtained by wetting them, especially if the time between scalding and entry into the conditioning area is lengthy, or if the relative humidity in the conditioning area is low. Additional surface water also helps ensure adequate electrical contact during stimulation and acts as a lubricant on the feathers, thereby easing movement on the shackle line.

The length of the conditioning step in the warm, humid area is dependent on the degree of tenderness desired, with longer duration resulting in more tender cooked meat. Large, old, or tough poultry may require a longer conditioning period than will small, young, or tender birds. It has been discovered that, typically, conditioning periods of between about 5 to 60 minutes are satisfactory, while 15–35 minute periods are preferred for most commercially saleable poultry, such as chickens. One skilled in the art can determine the appropriate conditioning period for the type poultry to be processed.

At the completion of the conditioning step, during which induction of rigor mortis is completed, the carcasses are removed from the conditioning area and are defeathered and eviscerated. Preferably, the carcasses are continuously transported on the shackle line, thereby ensuring that the carcasses are scalded in proper sequence, conditioned uniformly, and subsequently treated without delay. The procedures used to accomplish defeathering and evisceration are not critical to the method of this invention. Therefore, any of the techniques well known in the art are acceptable.

Immediately following evisceration, the carcasses may be injected with a solution which comprises phosphate salts and sodium chloride, if desired. The purpose and use of this phosphate- and salt-containing solution are well known in the art. Any solution temperature can be utilized in the method of this invention. In an alternative embodiment of this invention, the poultry can be cut up into discrete pieces before the phosphate- and salt-containing solution is injected. Thereafter, processing proceeds in the manner described herein.

Cooking can be done in any manner known in the art. For example, poultry can be cooked whole or in parts, and can be either uncoated or coated with batter, breading, and the like. Further, it can be fried, roasted, or steamed, or a combination of these methods can be used. The number of parts into which a carcass is cut is not critical to the practice of this invention. The time required to cook each part will be dependent upon not only the size but also the identity (e.g., breast, wing, drumstick, thigh) of the part. Skilled artisans can adjust the cooking time. In the practice of this invention, however, the time required to cook the poultry clearly will be shorter than the time required to cook chilled poultry. The expected temperature of the poultry prepared in the practice of the preferred embodiment of this invention between about 80° to 115° F. before cooking, whereas the temperature of the conventionally prepared poultry would be about 40° F.

Tenderness of the meat is measured in an Instron Model 1000 shear press. Cooked meat is trimmed to remove all fat, bone, burnt areas, gristle, and other deleterious material. The meat is hand-cut into approximately ⅜ inch cubes. The cubes aremixed, then weighed into 20-gram portions. Multiple portions from the same muscle are utilized for confirmatory tests.

The diced meat is spread evenly over the interior bottom surface of a metal cube approximately 2½ inches on each side. The sides and bottom of the cube are slotted, and a slotted top covers the cube. The cube is placed inside the Instron shear press, wherein a plurality of blades enters the slots in the cube and cube cover. As the blades are forced through the meat, the shear press measures and records the pounds of force required to cut through the meat. In this invention, the preferred shear value is less than about 280, and more preferably less than about 240, for broilers and similar chickens. Those skilled in the art recognize that other Instron shear values will be appropriate for other poultry. For example, for mature breeder hens, Instron values about 125 pounds higher, i.e., less than about 405 and preferably less than about 365, would be expected.

Although the above-described embodiments of this invention involve continuous processing, the method of this invention may be practiced batchwise. Therefore, the invention is not limited to continuous processing, but embraces batchwise processing as well.

The invention is further illustrated in the following examples.

EXAMPLE 1

Fifty-eight broiler chickens, each weighing about 3.5 pounds, were killed with a pre-kill stun of 50 volts AC and standard neck cut to bleed the chicken. After 20 seconds of bleed time, the birds were stimulated with 40 volts AC pulsed at 0.3 seconds on and 0.3 seconds between applications for 70 seconds. Then the carcasses entered the scalder. After scalding in the commercial scalder for approximately 70 seconds, the birds were transported to a conditioning area and again stimulated at 40 volts for 3.5 minutes, with current applied for 0.3 seconds and 0.3 seconds between applications.

After stimulation, the birds then were held in a humid atmosphere at 85° F. for 20 additional minutes before being defeathered in a commercial device. At 40 minutes post-mortem, breast fillets were removed from the carcasses and cooked in a multipurpose oven for 4.8 minutes at 360° F. dry bulb temperature and 180° F. wet bulb temperature. Instron shear values for twenty gram samples averaged 228 pounds.

EXAMPLE 2

Forty-two large (about 8.5 pounds live) broiler chickens were processed in the manner described in Example 1. Instron shear values averaged 256.

EXAMPLE 3

Sixty-one large (about 8 pounds live) broiler chickens were processed in the manner described in Example 1. Instron shear values averaged 267.

COMPARATIVE EXAMPLE I

Chickens of various sizes, generally similar to those of Examples 1-3, were slaughtered by conventional methods and either not aged or aged in ice for four hours, then prepared in a multi-purpose oven, as described in Example 1. Instron shear values averaged about 413 for non-aged breasts and about 299 for breasts aged 4 hours.

COMPARATIVE EXAMPLE II

Mature, heavy (about 10 pounds) breeder hen chickens were processed by conventional means, by the method of U.S. Pat. No. 4,675,947, and by the method of this invention. Twenty birds were processed for each treatment outlined below, and each treatment was then replicated with another twenty birds.

Lot 1. Conventional process, no aging, breast fillets removed 40 minutes after slaughter.
Lot 2. Conventional process, aged in ice 4 hours.
Lot 3. Conventional process, aged in ice 8 hours.
Lot 4. Conventional process, aged in ice 24 hours.
Lot 5. Method of U.S. Pat. No. 4,675,947.
Lot 6. Method of this invention using electrical stimulation during the last half of a 90 second bleedout, and for 4 minutes immediately post-scald, then 20 minutes of conditioning time prior to defeathering.

Instron shear values are reported in Table 1 below. The table illustrates that the method of the invention yields meat which is more tender than conventionally-prepared cooked meat aged as much as 8 hours.

TABLE 1

| Instron Shear Values | |
|---|---|
| Conventional, no age | −484 |
| Conventional, 4 hour age | −583 |
| Conventional, 8 hour age | −449 |
| Conventional, 24 hour age | −228 |
| U.S. Pat. No. 4,675,947 | −397 |
| Method of this invention | −397 |

COMPARATIVE EXAMPLE III

One hundred forty-four 6 pound live broiler chickens were taken from one lot and divided into 18-bird test lots. Each of the following treatments was replicated by using a second 18-bird lot for each treatment:

1. Method of invention with electrical stimulation during the last half of a 90 second bleedout, and immediately after scalding.
2. Method of U.S. Pat. No. 4,675,947.
3. Conventional processing method with no aging
4. Conventional processing with 4 hours age time.

Breast fillets were stripped off the birds and cooked as in Example 1 above. Results are as follows:

| Lot | Mean Instron Value |
|---|---|
| 1 | 239 |
| 2 | 210 |
| 3 | 345 |
| 4 | 246 |

This example directly compares known methods using conventional processing controls and the new process described in this embodiment. The method of the invention produced acceptably tender results comparable to aged product.

Although preferred embodiments of this invention have been discussed herein, those skilled in the art will appreciate that changes and modifications may be made without departing from the spirit of this invention as defined in and limited only by the scope of the appended claims.

We claim:

1. A method for processing poultry in substantilly less time and using substantially less energy, which method comprises the steps of:
   (a) providing a live poultry bird;
   (b) slaughtering said bird with the application of electrical energy to stun or electrocute said bird and bleeding said bird;
   (c) subjecting the carcass of step (b) to intermittent electrical stimulation while it is bleeding;
   (d) scalding the carcass resulting from step (c);
   (e) subjecting said scalded carcass to a relatively short conditioning step wherein said carcass is held in a warm, humid atmosphere and during which intermittent electrical stimulation is applied to said carcass for a period of time sufficient to render the poultry meat tender upon subsequent cooking without the need for an extended, low temperature carcass aging period; and
   (f) defeathering and eviscerating said carcass.

2. The method of claim 1 wherein the temperature of said atmosphere during said conditioning step is between about 70° to 110° F.

3. The method of claim 2 wherin the duration of said conditioning step is between about 5 to 60 minutes.

4. The method of claim 1 wherein the total time of said electrical stimulation treatment is between about 2 to 15 minutes.

5. The method of claim 1 wherein said intermittent application of current is for a duration of between about 0.1 to 5 seconds with non-current intervals of from about 0.1 to 5 seconds.

6. The method of claim 1 further comprising
   (g) dividing the carcass of step (f) into component parts.

7. The method of claim 6 wherein said carcass from step (f) or component parts of step (g) are immediately further processed, cooked, or cooled, and shipped following said processing.

8. The method of claim 6 wherein a solution comprising phosphate and salt is injected into the carcass of step (f) or the component parts of step (g).

9. The method of claim 5 wherein current is applied for between about 0.2 to 2 seconds with non-current intervals of between about 0.2 to 2 seconds.

10. The method of claim 4 wherein the voltage applied to the carcasses during stimulation between about 10 and 200 volts.

11. The method of claim 1 wherein the bird is bled for up to about 3 minutes and said electrical stimulation of step (c) is applied during about the second half of the bleeding period.

12. A method for processing poultry comprising the steps of:
(a) providing a live poultry bird;
(b) slaughtering said bird with the application of electrical energy to stun or electrocute said bird and bleeding said bird;
(c) subjecting the carcass of step (b) to intermittent electrical stimulation applied at between about 10 to 200 volts while the bird is bleeding;
(d) scalding the carcass resulting from step (c);
(e) subjecting said scalded carcass to a conditioning step for between about 5 and 60 minutes wherein said carcass is held in a warm, humid atmosphere and during which intermittent electrical stimulation is applied to said carcass at between about 10 to 200 volts for a period of between about 2 to 15 minutes less the period of stimulation of step (c) to render the poultry meat tender upon subsequent cooking without the need for an extended, low temperature carcass aging period; and
(f) defeathering and eviscerating said carcass.

13. The method of claim 12 wherein intermittent application of current is for a duration of between about 0.1 to 5 seconds with non-current intervals of between about 0.1 to 5 seconds.

14. The method of claim 13 further comprising
(g) dividing the carcass step (f) into component parts.

15. The method of claim 14 wherein a solution comprising phosphate and salt in injected into the carcass of step (f) or the component parts of step (g).

* * * * *